US012572966B2

(12) United States Patent
Hughes

(10) Patent No.: US 12,572,966 B2
(45) Date of Patent: *Mar. 10, 2026

(54) METHODS FOR SAFE DELIVERY OF A PACKAGE

(71) Applicant: Cameron Hughes, San Mateo, CA (US)

(72) Inventor: Cameron Hughes, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/393,431

(22) Filed: Dec. 21, 2023

(65) Prior Publication Data

US 2024/0169306 A1 May 23, 2024

Related U.S. Application Data

(63) Continuation of application No. 16/469,933, filed as application No. PCT/US2018/014166 on Jan. 18, 2018, now Pat. No. 11,853,952.

(60) Provisional application No. 62/447,748, filed on Jan. 18, 2017.

(51) Int. Cl.
*G06Q 30/0601* (2023.01)
*G06Q 10/0832* (2023.01)

(52) U.S. Cl.
CPC ..... *G06Q 30/0607* (2013.01); *G06Q 10/0832* (2013.01); *G06Q 30/0635* (2013.01)

(58) Field of Classification Search
CPC ........... G06Q 30/0607; G06Q 10/0832; G06Q 30/0609; G06Q 30/037; G06Q 30/0633–0635; G06Q 30/0641–0643; G06Q 30/0639; G07C 9/00309; G07C 9/00817; G07C 9/00896; G07C 2009/0092
See application file for complete search history.

(56) References Cited

U.S. PATENT DOCUMENTS

| | | | | |
|---|---|---|---|---|
| 10,097,353 B1 * | 10/2018 | Carlson | ................ | H04L 67/306 |
| 11,853,952 B2 | 12/2023 | Hughes | | |
| 2005/0104730 A1 | 5/2005 | Yang | | |
| 2007/0227913 A1 | 10/2007 | Shoenfeld | | |

(Continued)

FOREIGN PATENT DOCUMENTS

WO        2018/136599 A1        7/2018

OTHER PUBLICATIONS

Bensinger, "Amazon's New Secret Weapon: Delivery Lockers", Wall Street Journal, WSJ.com (2012).

(Continued)

*Primary Examiner* — Kelly S. Campen
*Assistant Examiner* — Katherine A Barlow
(74) *Attorney, Agent, or Firm* — Schmidt Patent Law, Inc.

(57) ABSTRACT

A method of ordering and receiving goods is disclosed. According to an example embodiment, the method comprises: registering a user with an online entity to create a user account, the registration process includes: taking a photograph of the user's face next to a photo identification (ID) issued to the user, transmitting the photograph and the user's signature to the online entity, and receiving confirmation of creation of the user account from the online entity; submitting an order under the user account for the goods; receiving a delivery of the goods in a secured container; receiving a passcode separate from the delivery; and utilizing the passcode to unlock the secured container and retrieve the goods.

15 Claims, 5 Drawing Sheets

(56) References Cited

U.S. PATENT DOCUMENTS

| | | | |
|---|---|---|---|
| 2008/0004995 | A1 | 1/2008 | Klingenberg |
| 2010/0148947 | A1 | 6/2010 | Morgan |
| 2011/0040650 | A1 | 2/2011 | Johnson |
| 2013/0144428 | A1 | 6/2013 | Irwin et al. |
| 2014/0317005 | A1* | 10/2014 | Balwani .................. B65D 81/38 |
| | | | 705/317 |
| 2015/0145643 | A1 | 5/2015 | Fadell et al. |
| 2016/0071101 | A1* | 3/2016 | Winarski ............... G06V 40/40 |
| | | | 705/71 |
| 2016/0300187 | A1* | 10/2016 | Kashi ................. G06Q 10/0832 |
| 2016/0307380 | A1 | 10/2016 | Ho et al. |
| 2018/0033235 | A1* | 2/2018 | Dotterweich ........... G07F 17/12 |
| 2018/0096270 | A1* | 4/2018 | High .................. G07C 9/00896 |
| 2018/0176017 | A1* | 6/2018 | Rodriguez .............. H04L 63/20 |

OTHER PUBLICATIONS

Jolly, "Protect your online purchases from 'porch pirates'", USAToday.com (2016).

Van Hoof, "The effectiveness of ID readers and remote age verification in enhancing compliance with the legal age limit for alcohol", The European Journal of Public Health, vol. 27, Issue 2, pp. 357-359, https://doi.org/10.1093/eurpub/ckw183 (2016).

International Search Report corresponding to PCT/US2018/014166, May 14, 2018, 1 page.

\* cited by examiner

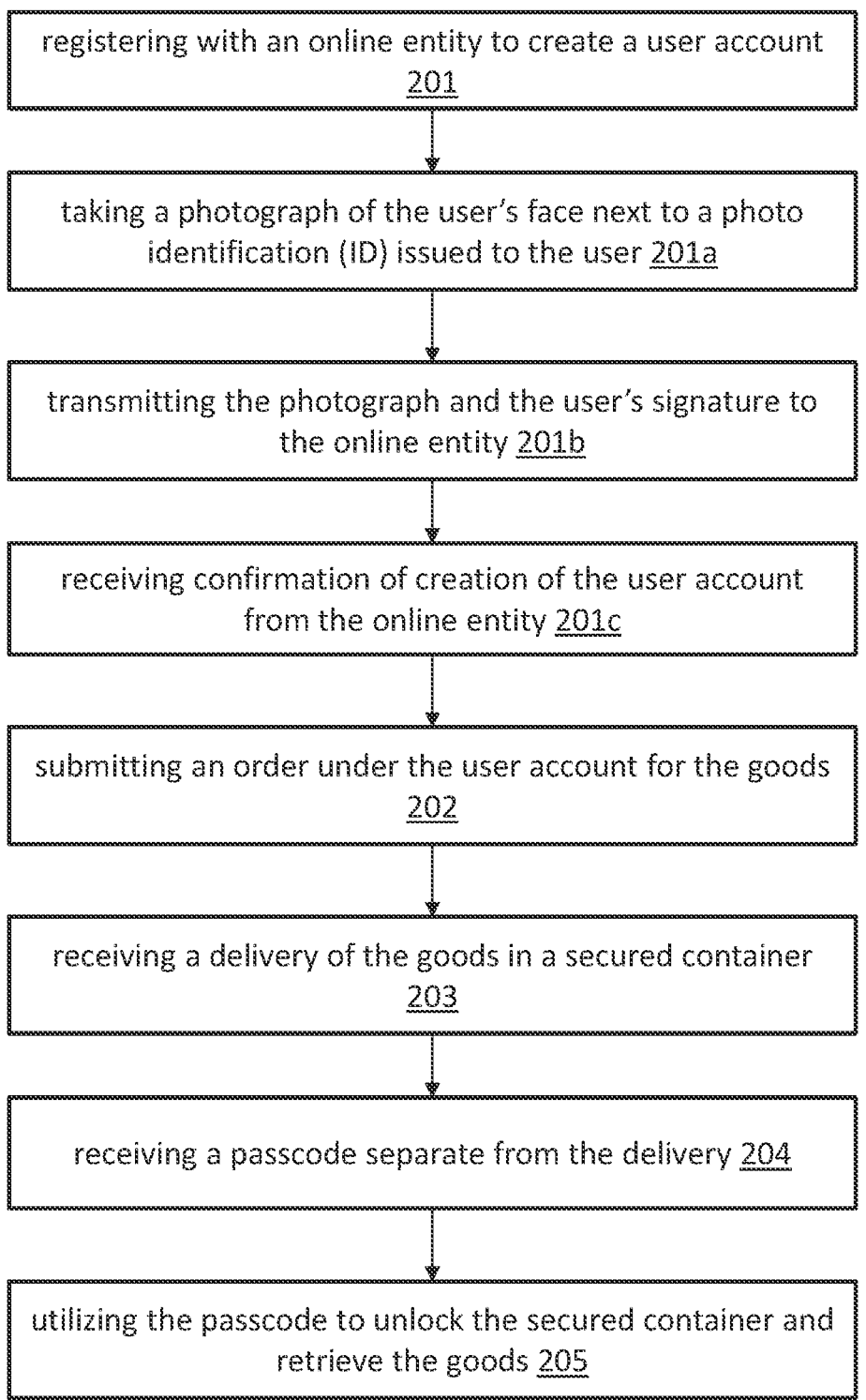

registering with an online entity to create a user account
201 taking a photograph of the user's face next to a photo
identification (ID) issued to the user 201a transmitting the photograph and the user's signature to
the online entity 201b receiving confirmation of creation of the user account
from the online entity 201c submitting an order under the user account for the goods
202 receiving a delivery of the goods in a secured container
203 receiving a passcode separate from the delivery 204 utilizing the passcode to unlock the secured container and
retrieve the goods 205

FIG. 2 receiving order information associated with an order for the goods 401 sending the secured container including the goods to a delivery address associated with the user, the secured container configured to be unlockable by a passcode 402

METHODS FOR SAFE DELIVERY OF A PACKAGE

CROSS REFERENCE TO RELATED APPLICATIONS

This application claims benefit of priority to U.S. Non-provisional patent application Ser. No. 16/469,933 titled "Methods for Safe Delivery of a Package" and filed Jul. 14, 2019, which is a U.S. National Phase application under 35 U.S.C. 371 of International Patent Application No. PCT/US2018/014166 titled "System and Method for Safe Delivery of a Package" and filed Jan. 18, 2018, which claims benefit of priority to U.S. Provisional Patent Application No. 62/447,748 titled "System And Method For Safe Delivery Of A Package" and filed Jan. 18, 2017. All of the above applications are incorporated herein by reference in their entirety.

RELATED FIELD

The present disclosure relates to a system and method of delivering a package and safeguarding the package from those other than the intended recipient of the package.

BACKGROUND

Although common carriers, such as FedEx or UPS, may provide an estimated date of delivery for a package, they generally do not provide a specific delivery time. If no one is home to receive the package, the common carrier driver may leave the package at the doorstep, or if a signature or identification (ID) verification is required, the driver may leave a note and try back at a later date. This practice of common carriers often presents a number of difficulties to the package recipient.

For example, certain controlled substances, such as alcoholic beverages and prescription medications (e.g., those with a higher-than-average likelihood of abuse, classified "C2" or containing narcotics or amphetamines), may be ordered online and delivered via common carrier (where legal) so long as the seller is properly licensed. However, due to governmental restrictions, the purchaser or another legal adult would have to be present at the time of delivery and provide an appropriate form of identification (and age-verification if alcohol) to the delivery driver. The delivery driver cannot simply leave the package of controlled substance at the doorstep or with a minor. This means that a purchaser may have to stay home during the day to receive the package and verify his age and identity, or have the package delivered to the purchaser's place of work. The purchaser may be further inconvenienced if the common carrier driver changes the date of delivery at the last minute or leaves the note to try back later when the purchaser was in fact home at the time.

For cases in which the common carrier driver can leave the package at the doorstep (e.g., not a controlled substance), there is always the chance that the package may be stolen or tampered with.

In view of the foregoing, there exists a need for the presently disclosed system and method for safe delivery of a package, which may include a controlled substance, that overcome or mitigate the aforementioned difficulties.

SUMMARY

A method of ordering and receiving goods is disclosed. According to an example embodiment, the method comprises: registering a user with an online entity to create a user account, the registration process includes: taking a photograph of the user's face next to a photo identification (ID) issued to the user, transmitting the photograph and the user's signature to the online entity, and receiving confirmation of creation of the user account from the online entity; submitting an order under the user account for the goods; receiving a delivery of the goods in a secured container; receiving a passcode separate from the delivery; and utilizing the passcode to unlock the secured container and retrieve the goods. The method of identifying the user, however, is not limited to this example embodiment. According to various embodiments, other methods of identifying and authenticating the user, such as using fingerprints, retina scans, and facial recognition software, may be used to identify the user.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

FIG. 2 illustrates a flowchart of a process by which a user may order and receive safe delivery of goods, according to an example embodiment.

Figure 1:
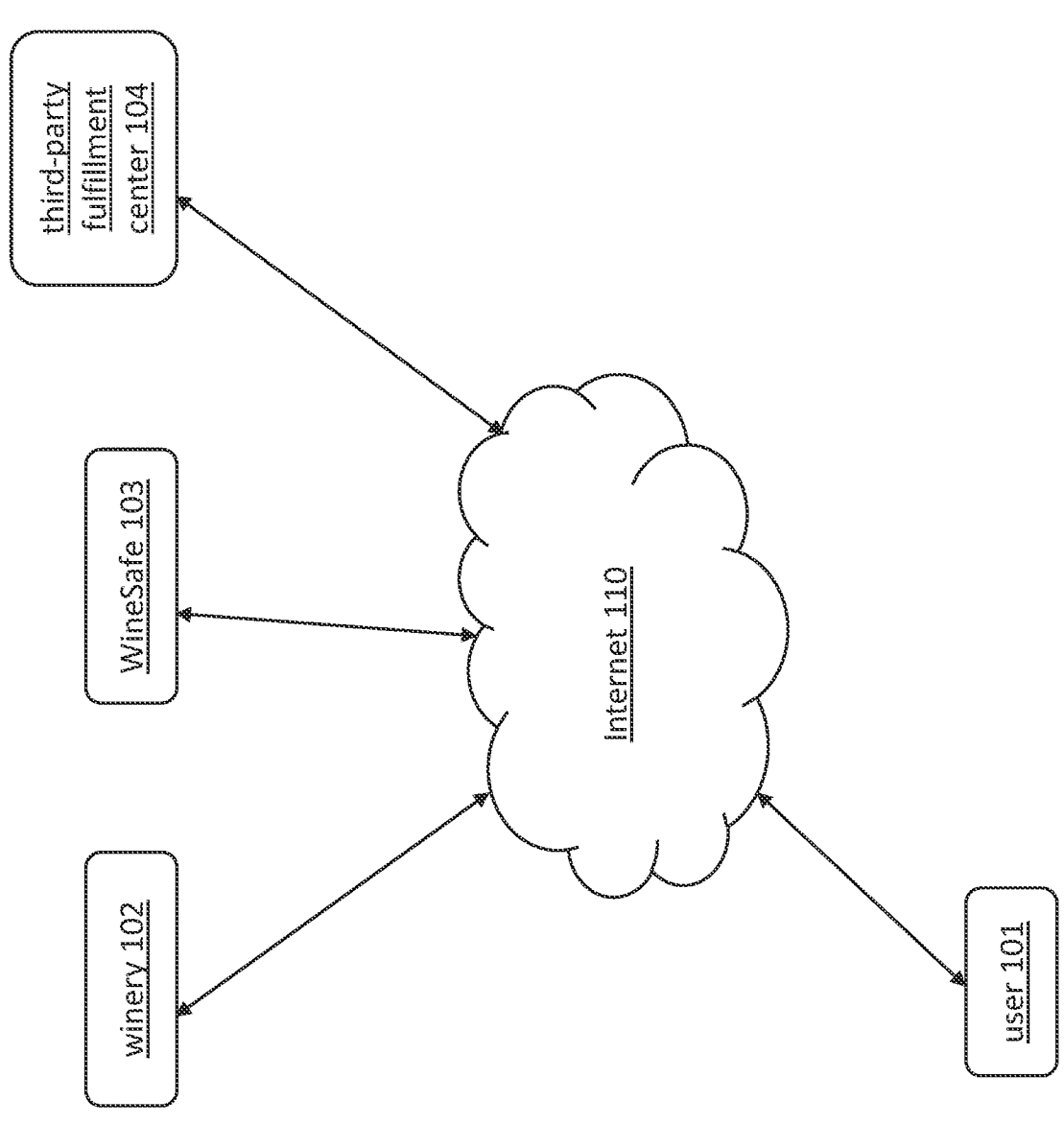
FIG. 1 is a block diagram depicting an implementation of the present system and method for online wine orders, according to an example embodiment.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide the present system and method. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

According to example embodiments, the present system and method enable the safe and compliant delivery of a package, which may include a controlled substance (e.g., drugs, firearms and ammunition) or other goods, via third-party common carriers (e.g., FedEx or UPS) without requiring an adult signature or presentation of an appropriate form of photo identification at the time of delivery, thereby allowing the package to be left on the purchaser's doorstep in the absence of the purchaser. The present system and method may ensure compliance with governmental restrictions of the controlled substance by pre-verifying a purchaser's age and identity through an online registration and account creation process. The present system and method may also prevent or mitigate opportunities for theft or tampering with the package by shipping the package in a secured container configured to be unlockable using a preset passcode. The secured container in which the package is shipped may also be thermally insulated, location-tracking enabled (e.g., via GPS) and geofenced.

FIG. 1 is a block diagram depicting an implementation of the present system and method for online wine orders, according to an example embodiment. Although the implementation of FIG. 1 is described herein using online ordering of wine as an example, the present system and method are not limited thereto.

A winery 102 may host an e-commerce site through which users may order wine from the winery. A user 101 may access the e-commerce site using a computerized device, such as a laptop, mobile phone or tablet, connected to the Internet 110. As discussed earlier, an adult signature and presentation of an appropriate photo ID are generally required at the time of delivery of a controlled substance, such as wine. However, according to example embodiments of the present system and method, the winery 102 may pre-verify the identity and age of those users who would like to have their wine order delivered to them without requiring an adult signature and presentation of an ID at the time of delivery.

For example, the user 101 may follow a link, which may be provided by the winery 102, to download a mobile application associated with an age and ID verification software service (hereinafter, the service is referred to as "Wine-Safe" for convenience). If the user 101 has not previously created an online account with WineSafe 103, the user 101 may create an account with WineSafe 103 through the mobile application. If the user 101 already has an account, the user may login to his account using his preset login credentials. The user account may be linked with a mobile phone number and/or payment information (e.g., credit card number) of the user 101.

As part of the registration and account creation process, the user 101 may provide a picture of his face next to a valid photo ID issued to the user 101. For example, using his camera-enabled mobile phone, the user 101 may take a picture, or "selfie," of himself holding his drivers license, or other government (e.g., state) issued ID, next to his face in the same picture and transmit the picture electronically to WineSafe 103. After receiving the picture, an actual person (e.g., human employee) at WineSafe 103 may review the picture to verify that the user's face matches that shown in the photo ID, which would satisfy a governmental requirement to check a purchaser's ID. As an alternative, or as an added layer of review, the WineSafe 103 may also or instead utilize computer facial recognition software to verify that the user's face in the picture matches that shown in the photo ID next to the user's face in the picture.

To further verify the identity and age of the user 101, or as an alternative to the use of a "selfie" as just described, WineSafe 103 may prompt the user 101 to input credit card information and the user's mobile telephone number. Wine- Safe 103 may run the credit card information through a third-party compliance engine that verifies the age of the credit card account owner through a proprietary database. WineSafe 103 may also run the user's mobile telephone number through a third-party database to verify the user's identity or send an SMS message to the user's mobile telephone number to confirm that it is indeed the user's mobile telephone number that was provided.

According to further embodiments, WineSafe 103 may utilize optical character recognition software to verify the user's address as shown in the photo ID with the address associated with the credit card and the shipping address. If the addresses do not match, the user may be red flagged. For example, in some cases, all the addresses may have to match in order for the user account to be created.

After the identity and age of the user 101 has been verified, the user 101 may receive a message (e.g., SMS) including or linking to a signature page, which may include disclaimers (e.g., not provide access to controlled substance to a minor). The user 101 must sign the signature page, and after which, the signature page is uploaded back to WineSafe 103 to be stored in a database. After WineSafe 103 has received the signature page, WineSafe 103 creates a user account for the user 101, and the user 101 is able to use the user account for all online purchases that subscribe to the WineSafe proprietary software system. However, licensing and compliance for the actual order remain the responsibility of the shipping winery.

For example, the user 101 may place a wine order through the winery 102's e-commerce site using his newly created WineSafe user account. After the user 101 has added the desired items to the online cart at the winery 102's e-commerce site and is ready for checkout, the e-commerce site may prompt or direct the user 101 to login to his WineSafe user account. If the user 101 successfully logs into his WineSafe user account, WineSafe 103 is provided with the order information. WineSafe 103 may authorize the wine order (e.g., confirm the ID on file is not expired, credit card information is up-to-date and no red flags) under the user account, and the user 101 may proceed to pay for the order by entering new payment information or by using the credit card information already on file with WineSafe (e.g., one-click purchase).

After the order is completed, the order may be sent to a third-party fulfillment center 104, and a tracking number for the order may be generated by a third-party common carrier. The third-party fulfillment center packs the order in a secured container configured to be unlockable using a passcode, which may be reprogrammable. The passcode may be generated by a proprietary system database (e.g., implemented by the winery 102, WineSafe 103 or third-party fulfillment center 104) and forwarded to the mobile device of the user 101, who has agreed via their signature to not release the passcode to a minor. A new passcode may be generated for each secured container and reprogrammed into a secured container prior to shipment, for example, by the third-party fulfillment center 104. The passcode may be generated, for example, based on the tracking number of the order. The secured container may also be thermally protected and GPS-enabled.

After the secured container containing the order is rendered to the third-party common carrier for shipment and scanned in, the location of a GPS-enabled secured container may be tracked by WineSafe 103 (e.g., using a proprietary database), and an alert may be sent to the user 101's mobile device when the shipment is within a certain radius of their delivery address. Also, a real-time tracking link for tracking the shipment may also be sent to the user 101's mobile device.

After the secured container is left at the user 101's delivery address and scanned out by third-party common carrier driver, a signal may be sent to the secured container to turn on a geofence software installed therein, which may sound an internal alert back to WineSafe 103 and/or user 101 if the secured container moves within a certain radius of the delivery address location. Under most circumstances, the secured container will remain in a locked, tamper-proof state until the user 101, who is the verified and intended recipient, arrives with the code and opens the secured container.

The passcode for unlocking the secured container may be entered, for example, manually or via an optical lens or camera mounted on the secured container. For example, the mounted camera or optical lens may read a code displayed on the user 101's mobile device (e.g., smartphone or other handheld device). Alternatively, the passcode may be entered using Near Field communication, similarly to as in contactless payment systems, for example by placing the mobile device in close proximity to the secured container. As yet another alternative, a text link sent to the mobile device may open the secured container upon activation (e.g., clicking on) the link In the latter case, to avoid inadvertent opening of the secured container in transit, such a text link may optionally be sent or activated only after delivery of the secured container has been confirmed.

Once opened by the user 101, who is the verified and intended recipient, the user 101 may empty the contents from the secured container, return the secured container to the front door area, and engage the Wine Safe software on the user's mobile device to alert the third-party common carrier and WineSafe that the secured container is ready for return pickup, The secured container may need to be returned within a certain timeframe. After being alerted for the return pickup, the third-party common carrier may pick up the secured container and return it to, for example, a warehouse operated by WineSafe 103 or the third-party fulfillment center 104 for redeployment.

According to example embodiments, the secured containers may be insulated and made of a reusable plastic material with strong insulating properties to ensure the safe delivery of wine in extreme temperatures. The secured containers may be available in a variety of size formats to facilitate various consumer orders, for example, between 2 and 12 bottles. The secured container's locking mechanism may be equipped with, for example, a keypad for manually entering a passcode and/or a code reading optical device/camera for scanning or reading the passcode (e.g., passcode may be a QR code), and/or a Near Field communication system. The secured container may also be equipped with a remote unlocking mechanism that allows, for example, WineSafe to remotely unlock the secured container.

The secured container may also be equipped with a built-in, battery powered GPS unit for package tracking and delivery notification. The GPS unit and battery pack may only be accessible from inside the secured container. The GPS unit may also provide geofencing features for theft control. Alternatively, or in addition, the secured container may include RFID and/or Wi-Fi technology to facilitate or enable tracking and geofencing.

The secured container may also include a temperature detector that alerts WineSafe to unsafe internal temperatures. The secured container may also provide loss of power and/or unauthorized ingress alerts. The secured container may also include a built-in accelerometer, which may provide data to support shipper accountability and breakage claims. The secured container may also include a refrigeration device, a dry ice compartment, or other cooling mechanism to cool the contents of the container, as needed.

The secured container may also feature a freezer gasket between its lid and container body to allow a vacuum seal to be created so that better insulation may be achieved. The secured container may further include an air valve to allow for air removal to create the vacuum seal and a vacuum release valve (e.g., a Grizzly Valve) to remove the vacuum seal so as to allow access to the formerly vacuum-sealed lid. The secured container may further include an integrated system hinge to prevent entry and built-in wheels and handles for 12-bottle and potentially 6-bottle formats.

As such, the present system and method obviate the need for an adult signature for verification at time of delivery of a shipment, and thereby the need for the intended recipient to be home to receive the package, by pre-verifying the identity and age of the purchaser/intended recipient. In addition to providing layers of security to wineries (and other sellers of controlled substances) in the form of age-verification, the added feature of having an actual person to review online the picture of a state issued photo ID next to the face of the person showing the ID (recipient) enables the winery to fulfill state requirements that recipient's ID be checked and an adult signature be obtained.

Referring again to FIG. 1, although this figure shows only a single winery 102 and a single third party fulfillment center 104, an age and ID verification service ("WineSafe") 103 as described herein may operate in association with one or more wineries and with one or more third party fulfillment center. That is, WineSafe may allow users to purchase from any of one or more wineries utilizing the services of any of one or more third party fulfillment centers.

FIG. 2 illustrates a flowchart of a process by which a user may order and receive safe delivery of goods, according to an example embodiment. The user registers with an online entity to create a user account (201). The registration process includes: taking a photograph of the user's face next to a photo identification (ID) issued to the user (201*a*), transmitting the photograph and the user's signature to the online entity (201*b*), and receiving confirmation of creation of the user account from the online entity (201*c*). The user submits an order under the user account for the goods (202); receives a delivery of the goods in a secured container (203); receives a passcode separate from the delivery (204); and utilizes the passcode to unlock the secured container and retrieve the goods (205).

Figure 3:
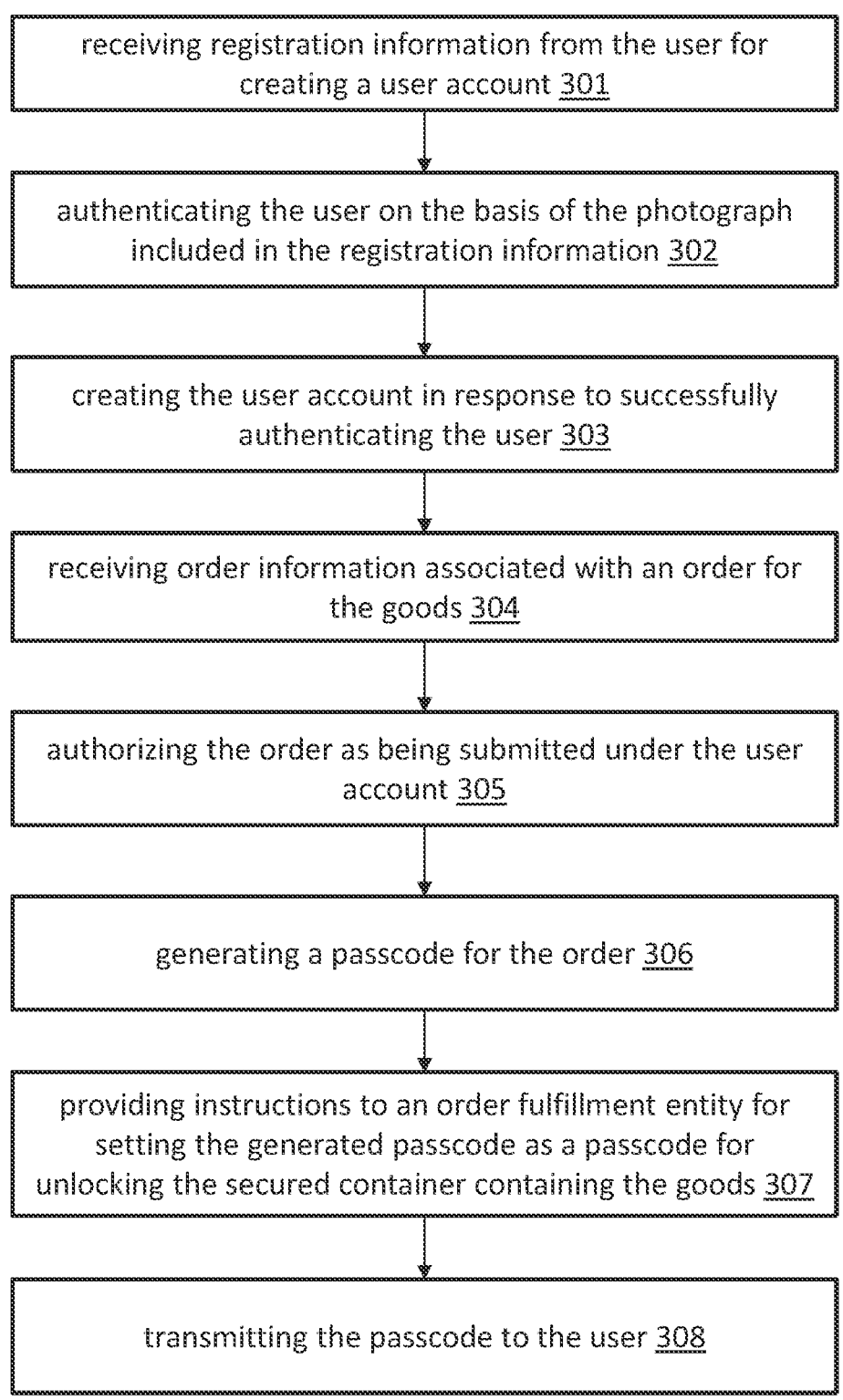
FIG. 3 illustrates a flowchart of a process by which an online entity may provide goods to a user in a secured container, according to an example embodiment.

FIG. 3 illustrates a flowchart of a process by which an online entity, such as WineSafe described herein, may provide goods to a user in a secured container, according to an example embodiment. The online entity receives registration information from the user for creating a user account (301). The registration information includes: a photograph of the user's face next to a photo identification (ID) issued to the user, and the user's signature. The online entity authenticates the user on the basis of the photograph (302); creates the user account in response to successfully authenticating the user (303); receives order information associated with an order for the goods (304); authorizes the order as being submitted under the user account (305); generates a passcode for the order (306); provides instructions to an order fulfillment entity for setting the generated passcode as a passcode for unlocking the secured container containing the goods (307); and transmits the passcode to the user (308).

Figure 4:
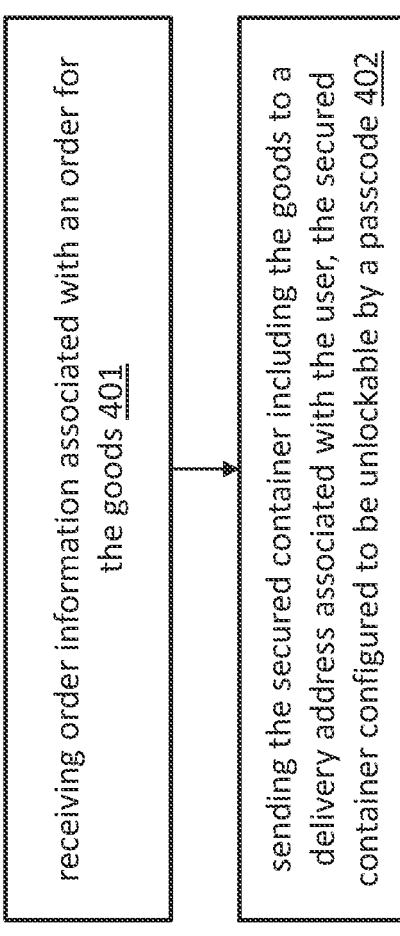
FIG. 4 illustrates a flowchart of a process by which an order fulfillment center may provide goods to a user in a secured container, according to an example embodiment.

FIG. 4 illustrates a flowchart of a process by which an order fulfillment center may provide goods to a user in a secured container, according to an example embodiment. The order fulfillment center: receives order information associated with an order for the goods (401); and sends the secured container including the goods to a delivery address associated with the user, the secured container configured to be unlockable by a passcode (402).

Figure 5:
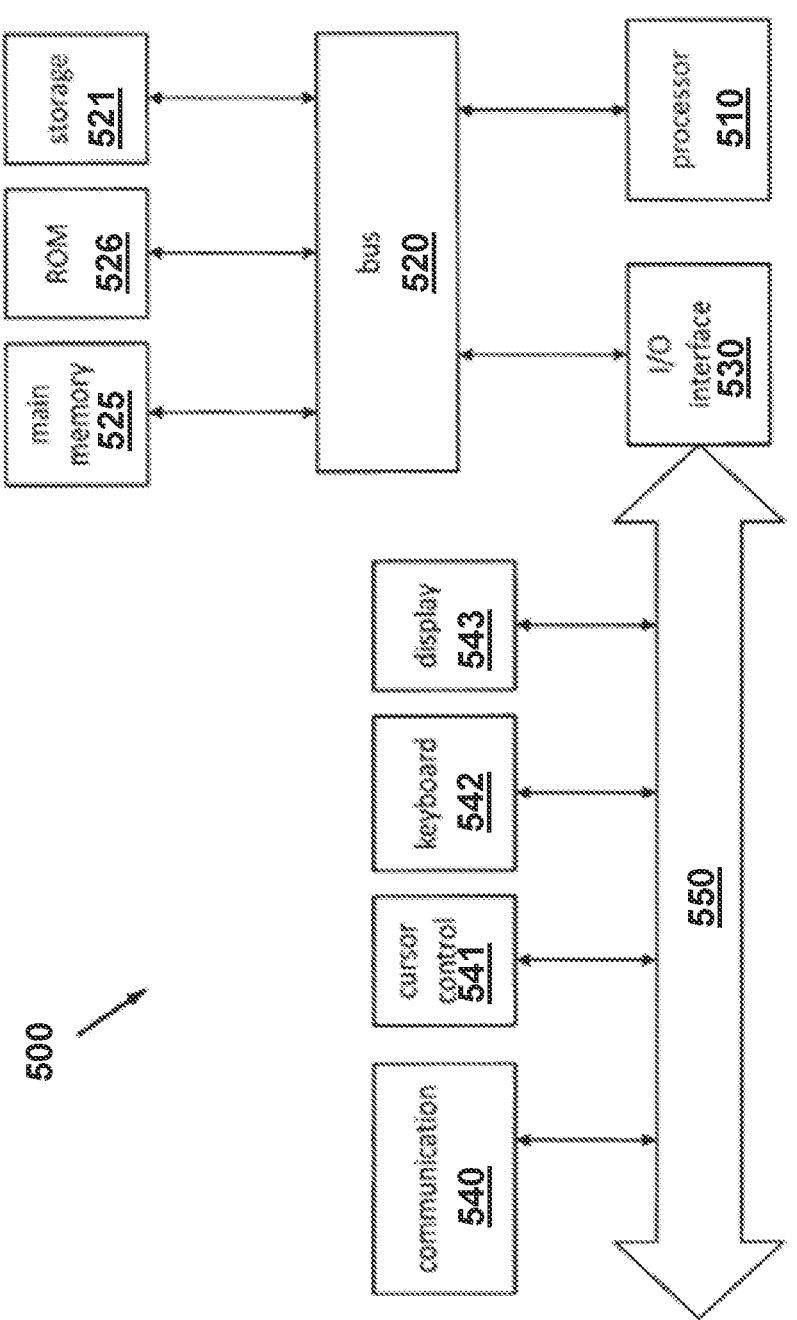
FIG. 5 illustrates an example computer architecture that may be used to implement embodiments of the present disclosure, for example, the mobile devices and computer servers for implementing e-commerce.

FIG. 5 illustrates an example computer architecture that may be used to implement embodiments of the present system and method. The example computer architecture may be used for implementing one or more components described in the present disclosure including, but not limited to, mobile devices, computer servers for support e-commerce and other computerized devices. One embodiment of architecture 500 comprises a system bus 520 for communicating information, and a processor 510 coupled to bus 520 for processing information. Architecture 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Architecture 500 may also include a read only memory (ROM) and/or other static storage device 526 coupled to bus 520 for storing static information and instructions used by processor 510.

A data storage device 521 such as a magnetic disk or optical disc and its corresponding drive may also be coupled to architecture 500 for storing information and instructions. Architecture 500 can also be coupled to a second I/O bus 550 via an I/O interface 530. A plurality of I/O devices may be coupled to I/O bus 550, including a display device 543, an input device (e.g., an alphanumeric input device 542, a cursor control device 541, and/or a touchscreen device).

The communication device 540 allows for access to other computers (e.g., servers or clients) via a network. The communication device 540 may comprise one or more modems, network interface cards, wireless network interfaces or other interface devices, such as those used for coupling to Ethernet, token ring, or other types of networks.

Some portions of the detailed description herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, messaging servers, or personal computers may be used with programs in accordance with the teachings herein, or it may prove convenient to construct a more specialized apparatus to perform the required method steps. The required structure for a variety of these systems appears in the description above. A variety of programming languages may be used to implement the teachings of the disclosure as described herein.

Moreover, the various features of the representative examples and the dependent claims may be combined in ways that are not specifically and explicitly enumerated in order to provide additional embodiments of the present teachings. The dimensions and the shapes of the components shown in the figures are designed to help understand how the present teachings are practiced and do limit the dimensions and the shapes shown in the examples.

What is claimed is:

1. A method of ordering and receiving goods, the method comprising:

registering a user with an online entity to create a user account, the registration process including:

taking a photograph of a face of the user next to an official photo identification (ID) issued to the user by a government, the official photo ID indicating that the user is of legal age to purchase the goods, receiving a digitally transmitted signature page, signing the signature page with a signature of the user, transmitting the photograph and the signature of the user to the online entity, and after transmitting the photograph and the signature of the user, receiving confirmation of creation of the user account from the online entity;

submitting an order under the user account for the goods comprising a delivery address;

receiving a notification at a device of the user in response to a delivery of the goods entering a threshold distance from the delivery address;

receiving the delivery of the goods in a secured container;

receiving a passcode for the secured container separate from the delivery on the device of the user;

utilizing the passcode to unlock the secured container; and retrieving the goods.

2. The method of claim 1, wherein the user device is a mobile device.

3. The method of claim 2, wherein utilizing the passcode to unlock the secured container comprises displaying the passcode to a camera on the secured container.

4. The method of claim 2, wherein utilizing the passcode to unlock the secured container comprises manually entering the passcode on the secured container.

5. The method of claim 2, wherein utilizing the passcode to unlock the secured container comprises placing the mobile device in close proximity to the secured container such that near-field communication is enabled, and transmitting the passcode by near field communication.

6. The method of claim 2, wherein the secured container contains a cooling mechanism to cool an inside of the secured container.

7. The method of claim 1, wherein the secured container is arranged to create a vacuum seal.

8. A method of providing goods to a user, the method comprising:

receiving a photograph of a face of the user next to an official photo identification (ID) issued to the user by a government, digitally transmitting a signature page to the user, receiving a signature of the user on the signature page;

authenticating the user on the basis of the photograph, the authentication comprising verifying the age of the user;

creating a user account in response to successfully authenticating the user and receiving the signature of the user on the signature page;

receiving order information associated with an order for the goods comprising a delivery address;

authorizing the order as being submitted under the user account;

sending instructions to an order fulfillment entity to send the goods in a secured container to the user;

sending a notification to a device of the user in response to a delivery of the goods entering a threshold distance from the delivery address;

transmitting a link to the device of the user; and upon receiving confirmation that the goods have been delivered and that the user has activated the link via the device of the user, remotely unlocking the secured container.

9. The method of claim 8, wherein authenticating the user on the basis of the photograph comprises a human reviewing the photograph and verifying that the face of the user shown in the photograph matches that shown on the official photo identification.

10. The method of claim 8, wherein authenticating the user on the basis of the photograph comprises utilizing computer facial recognition software to verify that the face of the user shown in the photograph matches that shown on the photo identification.

11. The method of claim 8, wherein the information received from the user comprises credit card information of the user, and authenticating the user comprises verifying an age of the user based on the credit card information.

12. The method of claim 8, wherein the information received from the user comprises a mobile telephone number of the user, and authenticating the user comprises verifying an identity of the user based on the mobile telephone number.

13. The method of claim 8, wherein the registration information received from the user comprises a credit card information of the user, and authenticating the user comprises comparing an address of the user shown on the official photo ID to the address of the user determined using the credit card information.

14. The method of claim 8, further comprising, after authorizing the order as being submitted under the user account, confirming that the official photo ID issued to the user is not expired.

15. The method of claim 8, further comprising receiving confirmation that the secured container has been delivered before transmitting the link to the user.

\* \* \* \* \*